United States Patent [19]

Lofgren

[11] 4,060,043
[45] Nov. 29, 1977

[54] DIGGING AND PLANTING MACHINE

[75] Inventor: Stig-Gunnar Lofgren, Jarved, Sweden

[73] Assignee: Mo och Domsjo AB, Ornskoldsvik, Sweden

[21] Appl. No.: 601,557

[22] Filed: Aug. 4, 1975

Related U.S. Application Data

[63] Continuation-in-part of Ser. No. 526,278, Nov. 22, 1974, Pat. No. 3,998,171.

[30] Foreign Application Priority Data

Aug. 15, 1974 Sweden .................. 7410431

[51] Int. Cl.² .................. A01C 5/04; A01C 11/02
[52] U.S. Cl. .................. 111/3; 111/89
[58] Field of Search .................. 111/2–4, 111/93, 89, 92, 95, 98, 99, 94, 97, 90, 91, 96; 172/261; 222/560

[56] References Cited

U.S. PATENT DOCUMENTS

| 181,065 | 8/1876 | Goodwin | 111/4 |
|---|---|---|---|
| 191,601 | 6/1877 | Knox | 111/4 |
| 389,709 | 9/1888 | Lupton | 111/95 |
| 588,386 | 8/1897 | Blaisdell | 111/92 |
| 813,987 | 2/1906 | McMahon | 111/93 X |
| 965,801 | 7/1910 | Engstrom et al. | 111/93 |
| 1,085,438 | 1/1914 | Knight | 111/93 |
| 1,477,097 | 12/1923 | Anderson et al. | 111/89 |
| 1,773,451 | 8/1930 | Etchison et al. | 111/4 |
| 1,808,759 | 6/1931 | Bickerton | 172/464 |
| 2,202,228 | 5/1940 | Owen | 111/4 |
| 2,514,522 | 7/1950 | Shelton | 111/3 |
| 2,668,684 | 2/1954 | Metzger | 222/560 X |
| 2,865,315 | 12/1958 | Goldstein | 111/99 X |
| 3,321,031 | 5/1967 | Evans | 172/261 X |
| 3,943,863 | 3/1976 | Leonard et al. | 111/2 |
| 3,972,294 | 8/1976 | Grundstrom et al. | 111/3 |

FOREIGN PATENT DOCUMENTS

| 45,369 | 2/1932 | Denmark | 111/3 |
|---|---|---|---|
| 688,921 | 8/1930 | France | 111/4 |
| 2,455,759 | 6/1975 | Germany | 111/3 |
| 289,921 | 2/1914 | Germany | 111/89 |
| 491,912 | 2/1930 | Germany | 111/3 |
| 581,249 | 8/1958 | Italy | 111/3 |

Primary Examiner—Edward M. Coven
Assistant Examiner—Steven A. Bratlie

[57] ABSTRACT

A digging and planting machine is provided, having a tubular digging and planting tool movable being ground-contacting and ground-elevated positions, and having an open digging and planting tip end; closure means movable between a first position closing off the open end for digging a hole and a second position exposing the open end for delivery of a plant from the planting tool into the hole; and means for compacting earth around the plant after planting.

14 Claims, 8 Drawing Figures

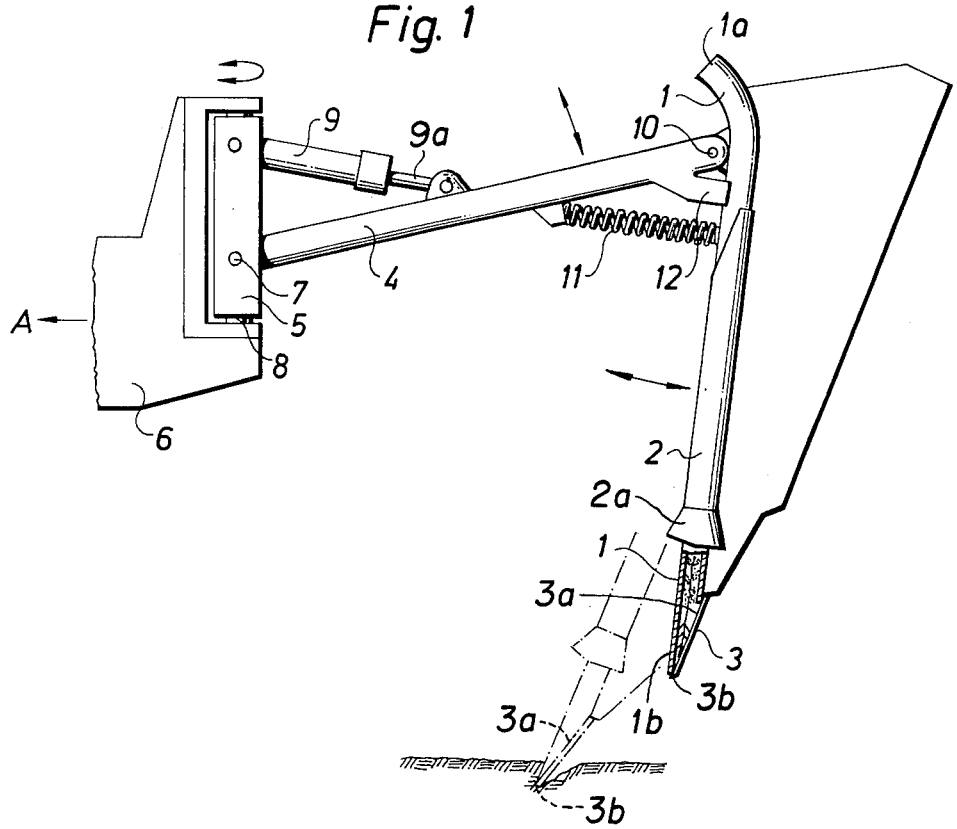
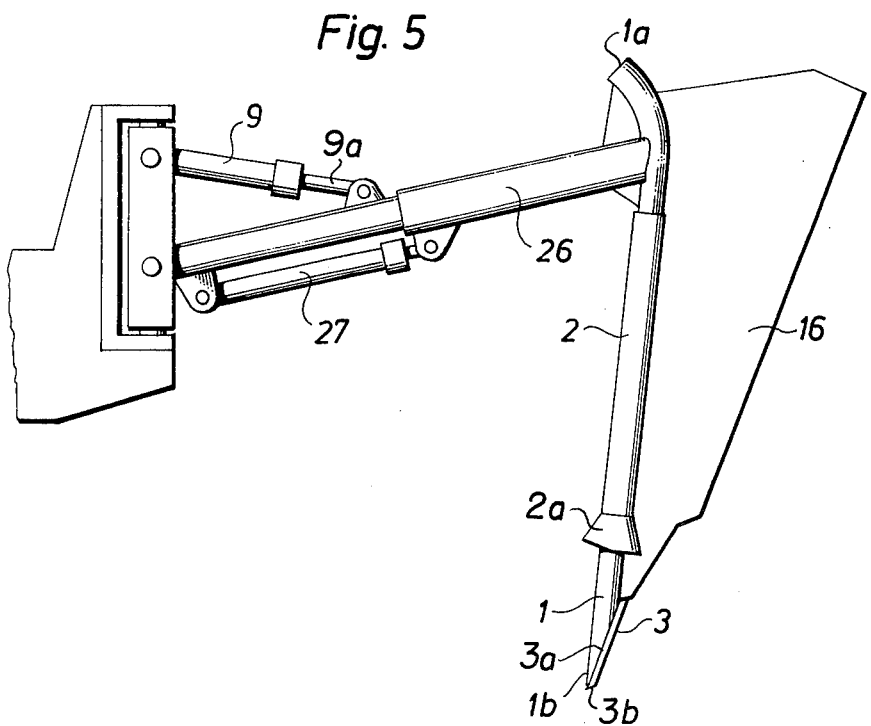

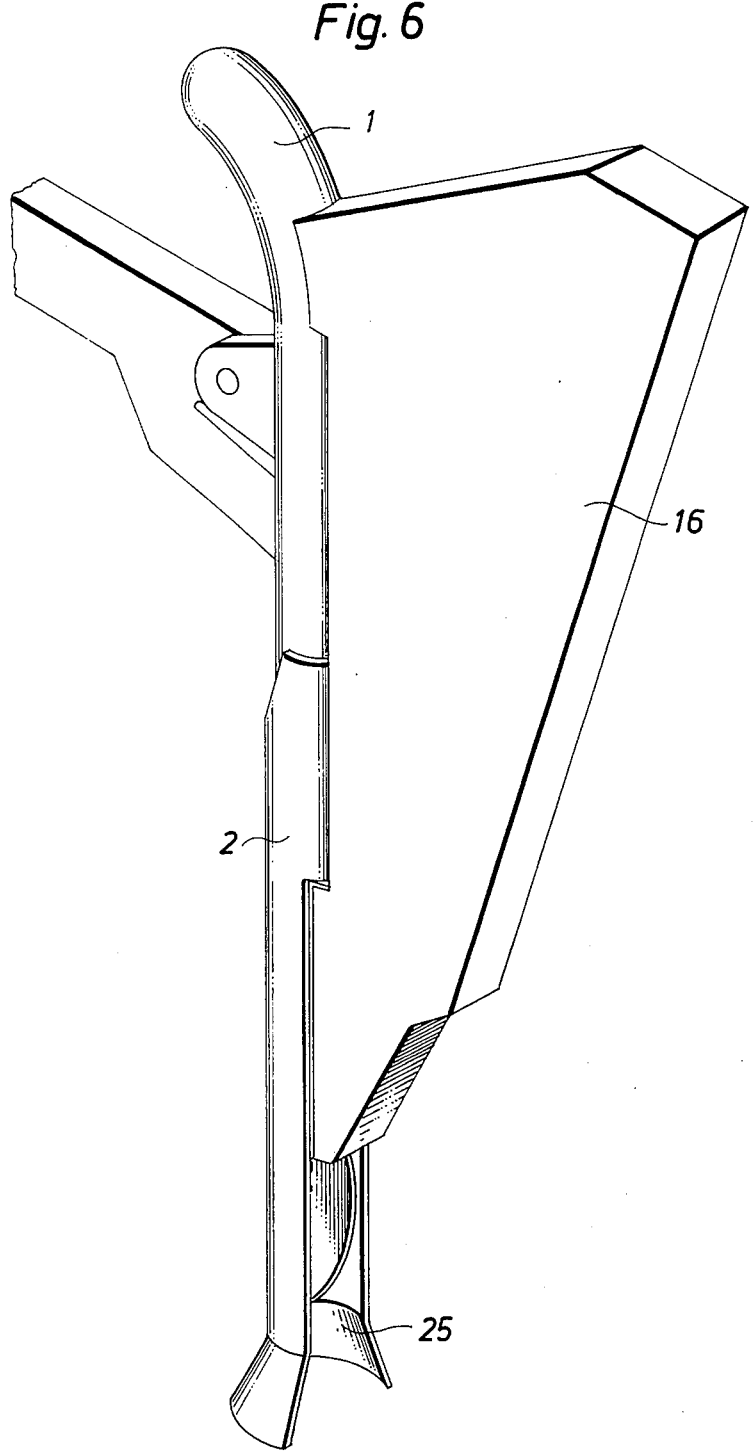

DIGGING AND PLANTING MACHINE

This application is a continuation-in-part of Ser. No. 526,278, filed Nov. 22, 1974, now U.S. Pat. No. 3,998,171.

Planting machines are now widely used in reforestation of cut or burned over or otherwise barren forest land. Frequently, however, the machines fail to set the plants in properly, and as a result the plants do not grow well, and may die.

There are two main types of reforestation or planting machines: those provided with tubular hole-making devices, and those provided with tubular plowing devices, which dig a furrow that has the hole at a deep end or portion thereof. Both of these devices operate intermittently and have open digging tip ends. The tubular plowing device has a number of serious disadvantages. Such devices take longer to plow a hole and plant a plant than the short time from 2 to 4 second allotted for each single planting operation, due to the fact that the feed-out end of the planting tool is either substantially planar or slightly V-shaped Consequently, the planting means, despite its simultaneous forward movement, encounters a high degree of resistance when moved into the ground.

Another disadvantage of tubular plowing devices is that, even when the devices are arranged to be inserted into the ground with an oblique, downward movement, the earth, stones, and other debris tend to penetrate the plant exit opening of the planting device, and makes feeding of the plants through the opening difficult. The reason why earth penetrates the planting tube is that the downwardly facing opening of the tubular planting device is either substantially horizontal or is inclined to the surface of the ground at an angle which is smaller than the angle formed between the movement path of the planting device and the surface of the ground.

Moreover, since the digging tip end is open, a plant cannot be placed in the tube until the planting site has been selected by the operator, and the tube is located over it. Since many suitable planting sites are not greater than about 0.5 to 1 $m^2$ in area, at excessive vehicle speeds the planting tube is liable to pass the planting site, or to be located over a place where the depth of earth is not favourable, before the plant can be delivered from the tube. To reduce this risk, it has been necessary to drive the machine at a relatively low forward speed, which greatly reduces the planting capability of the machine.

Another problem is that the open tip end of the tool can strike hard against stones and other obstacles in the ground, resulting eventually in a sufficient deformation of the tip end to render it unserviceable. This has limited the speed at which the planting tool can be inserted into the ground.

The present invention provides a planting machine which ovrcomes these disadvantages, reduces the distance through which a plant must travel at the actual moment of planting, and increases the speed at which the digging and planting tube can dig a hole and plant a plant, without danger of obstruction.

The digging and planting machine according to this invention can be used with machine-driven or towed forestry vehciles, and comprises at least one tubular digging and planting tool. A digging and planting machine is provided, having a tubular digging and planting tool movable between ground-contacting and ground-elevated positions, and having an open digging and planting tip end; closure means movable between a first position closing off the open end for digging a hole and a second position exposing the open end for delivery of a plant from the planting tool into the hole; and means for compacting earth around the plant after planting.

The closure means makes it possible to retain a plant in the tool at the exit opening while a hole is being dug by the tool, so that a plant can be held in a position of readiness, adjacent the exit opening, for delivery to the hole as it is dug. Because of the relatively short path through which th plant has to move when discharged from the tool, the machine can be advanced at a relatively high speed, without risk of the plant landing outside the planting site when the closure is opened, and it is discharged from the tube.

Furthermore, since the exit opening of the tube is closed while the tip is digging a hole, earth, stones, wood and other objects cannot enter the tube, and obstruct delivery of the plant to the hole.

In one advantageous embodiment of the invention, the closure means is in the form of a movable plate, arranged so that when in the closed position, the plate extends beyond the tip of the planting tool, and protects the point during when the digging or while in contact with the ground. In this way, the tip end of the tube is prevented from striking against stones and other obstacles liable to deform the tube, and it is possible to dig with the tube at a higher speed than was previously possible. A particularly high digging speed can be obtained with one embodiment of the invention, in which th plate is swung into its closing position.

The design of the digging tip end is conventional, and any available tip can be used. In accordance with a preferred embodiment of the invention, the digging tool is a tube whose digging end is cut off at an angle of less than 45° and preferably less than 30° to the axis of the tube, producing a sharp tip with an opening of oval configuration and downwardly curved, as seen in the direction of travel of the tool while digging, with the long axis of the oval-shaped end being vertically directed and being from about 2.5 to about 6, preferably from 3 to 4, times longer than the short axis. This design of digging tool tip gives better digging in the presence of obstacles such as branches, stones, and similar solid objects. This increases digging speed, and in, combination with a rapidly operating depth indicator, gives a high planting rate.

The sides of the plant delivery opening are preferably in the same plane and shaped to receive the closure means. The closure means can be a flat or curved plate movable between closed and open positions across and away from the opening. The closure means can be reciprocated, swung or pivoted between closed and open positions.

The present invention is particularly suitable for the hole-type and plowing-type planting devices having a digging tool arranged to be inserted into the ground along a straight or arcuate path to make a hole or to plow a furrow, said paths being directed obliquely downwards and forwards, in the direction of movement of the vehicle carrying the device. The discharge end of the digging tool is cut obliquely downwardly and forwardly in the direction of movement of the vehicle, in a plane which, during the whole of the insertion movement of the planting device or during the latter part of said movement, inclined more steeply than the direction in which the digging tool is inserted into the ground.

The tip of the digging tool is placed so that the leading side is solid tube, and the oval opening faces rearwardly.

The invention is described in detail with reference to a preferred embodiment thereof illustrated in the accompanying drawings, in which:

FIG. 1 is a side view of a planting machine according to the invention and shows the way in which said apparatus is connected tp a forestry planting vehicle, with the digging and planting tool shown in the elevated position immediately prior to being inserted into the ground for digging;

FIG. 5 is a diagrammatic side view of a variation of the machine of FIG. 1, showing a planting tool with a telescopic arm in a digging position;

FIG. 6 is a diagrammatic perspective view of the planting apparatus of FIG. 1 as seen obliquely from the rear;

Figure 2:
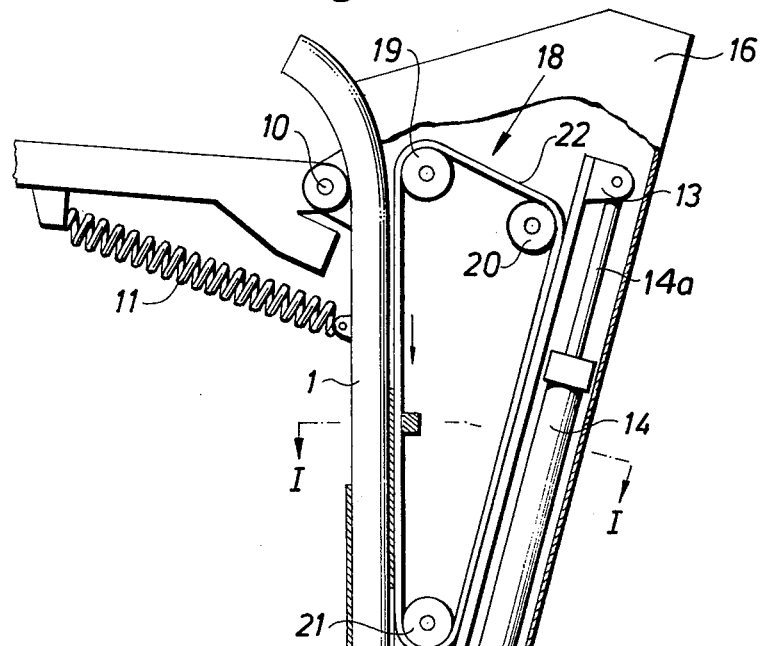
FIG. 2 is an enlarged detailed side view of the machine shown in FIG. 1, but with the casing removed.
Figure 4:
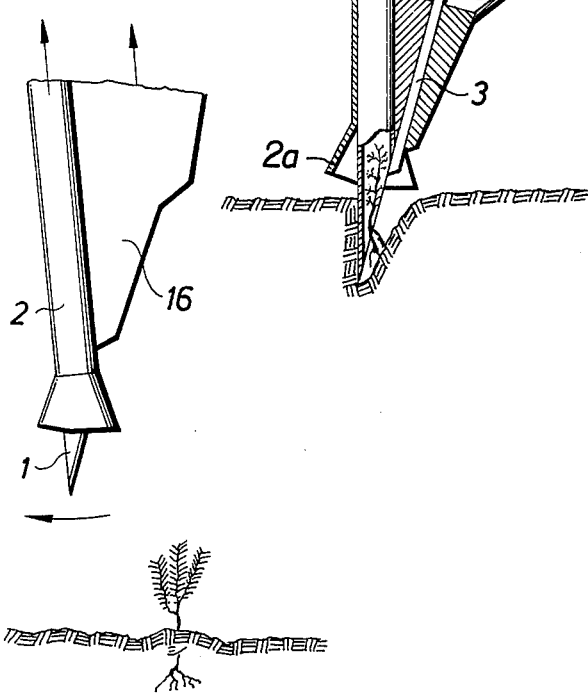
FIG. 4 is a diagrammatic side view of the machine of FIG. 1, showing the position of the planting tool subsequent to a planting operation, after having been moved upwardly and forwardly to a new starting position.

The digging and planting machine of FIGS. 1 to 4, 6 and 8 has a digging and planting tool for planting forestry plants, such as seedlings, including a tube 1 attached to an arm 4 secured to a support 5 mounted on the rear portion of a forestry vehicle, part of which is shown at 6, the direction of forward movement of the vehcile being shown by the arrow A. The arm 4 is pivotably mounted on the support 5 via horizontal pivot pin 7, while the support 5 is, in turn, pivotably mounted on a vertical shaft 8 mounted on the vehicle. Thus, the arm 4 and the tube 1 can be pivoted both vertically and horizontally.

A hydraulic cylinder 9 is pivotably connected via piston rod 9a between the arm 4 and the support 5, for rotating the arm 4 about the shaft 7. The arm 4 is pivotably attached to the tube 1 via transverse pivot pin 10, so that the arm 4 and the tube 1 can be pivoted vertically relative to one another.

A tension spring 11 is mounted between the arm 4 and the tube 1, and biases the tube 1 in the direction of forward movement A of the vehicle, into abutment against a shoulder 12 on the arm 4.

The tube 1 is open at 1a, 1b at both ends thereof. The upper end 1a is arranged for connection with a plant supply, from which plants are fed to the tube. The plant supply and the connections between the supply and the tube 1 are of conventional construction and are not shown on the drawings.

The face of the digging tip end 1b of tube 1 is inclined obliquely downwardly/forwardly, so as to form a digging tip, to facilitate digging of the tube into the ground.

A closure plate 3 is arranged for movement along the inclined face of the tip across the exit opening 3a of the tube 1, between two positions, in one of which it exposes and in the other of which it closes the exit opening of the tube 1. Such movement is effected reciprocably by the piston and cylinder 14. When occupying its closing position shown in FIG. 1, the plate 3 extends somewhat beyond the tip portion of the tube 1 as shown in FIG. 1.

The upper portion of the movable plate 3 is securely connected via lugs 13 (see FIG. 2) with the piston 14a of hydraulic cylinder 14, and it moves along a track 15 (see FIG. 8) mounted on a box-like frame 16 (FIGS. 2 and 8) which is securely connected to the tube 1. The hydraulic cylinder 14 is connected to a shock absorbing device 17, (see FIG. 7) which has the form of a small pressure accumulator adapted to dampen forceable movement upwards of the plate when it strikes a stone or other impenetrable obstacle, during digging.

A coupling means generally shown at 18 (see FIG. 2) connects the plate 3 with an earth-compacting means comprising a tube 2. The coupling means in the illustrated embodiment comprises three sprocket gears 19, 20, 21 mounted on the frame 16 between the tube 1 and the movable plate 3, and carrying an endless chain 22, which is securely connected to the movable plate 3 by bolt 23 (see FIG. 8). That portion of the chain which moves in the opposite direction to the movable plate 3 is connected to the earth-compacting tube 2 by peg 24.

The earth-compacting tube 2 has a lower end portion 2a which is shaped like a funnel, and encircles the tube. The tube 2 is displaceable along tube 1 between a lower actuated position and an upper nonactuated position. In the rearwardly facing portion of the earth compacting tube 2 there is provided an opening 25, to allow the compacting tube to be moved away from a plant after planting (see FIG. 6).

Figure 3:
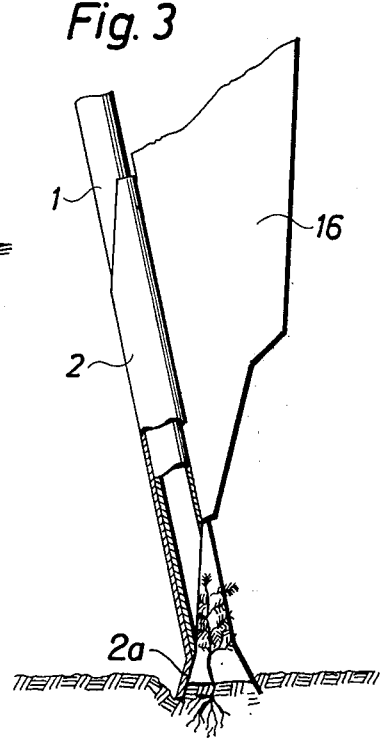
FIG. 3 is a diagrammatic side view of the machine of FIG. 1, showing the position occupied by the planting tube tool subsequent to the planting of a plant, with the earth-compacting means pressing earth around the plant.

Since the earth compacting tube 2 and the movable plate 3 are respectively connected to oppositely moving portions of the chain 22, they are moved in opposite directions when the hydraulic cylinder 14 is actuated. FIG. 1 shows the machine with the earth compacting tube 2 in its upper nonactuated position, and the opening 3a of tube 1 closed by the movable plate 3. FIG. 3 shows the earth compacting tube 2 in its lower actuated position, in which its open end 2a projects beyond the tube 1. In this position of the earth compacting means, the exit opening 3a of the tube 1 is completely exposed.

The planting machine operates in the following manner.

Subsequent to filling the supply with those plants which are to be planted, the movable plate 3 is moved across the exit opening 3a of the planting tube 1 and a plant (see FIg. 1) is conveyed from the supply down through the tube 1 into abutment against the inner face of plate 3, whereupon the machine is ready to effect a planting operation. The machine is then moved, by a tractor, for example, over the area to be planted, whilst the operator looks for a suitable planting site. During this phase of a planting operation, the planting tube 1 is maintained in a groundelevated position, out of contact with the ground, as shown in FIG. 1.

When th operator decides upon a site, he moves the planting tube over the site, and actuates the hydraulic cylinder 9 in a manner to rapidly extend the piston rod 9a of the cylinder. The planting tube 1 is thereby caused to dig into the ground in a direction obliquely downwards and forwards, as shown by the dashed lines in FIG. 1. When the planting tube 1 has penetrated the ground to the intended depth, movement of the rod 9a in hydraulic cylinder 9 is halted, for example, by manual manipulation on the part of the operator, or automatically by means of a ground level indicator.

In this way, the pivot pin 10 is positioned at a substantially constant height above the ground, and the planting tube 1 is rotated about the pivot pin 10 against the force of the spring 11, during the continued forward movement of the vehicle, whilst the tip portion of the planting tube 1 remains substantially in the same place in the ground (see FIG. 2).

After the planting tube 1 has been pivoted through a predetermined arc, a limiting switch (not shown) is actuated so as to cause the piston rod of 14a of the hydraulic cylinder 14 to be extended. The limiting switch can be mounted on the arm 4, for example. In this way, the movable plate 3 is rapidly moved up to expose the exit opening 3a of the planting tube 1, whereupn the plant (which has been resting against the plate) falls out through the opening. Simultaneously therewith, the earth-compacting tube 2 is moved down, to compact the earth around the plant and, upon contact with the ground, lifts the planting tube 1 to a level slightly above the ground (see FIG. 3). The pressure of the compacting tube 2 against the ground is thus determined by the weight of the planting tube 1, the frame 16, and other devices which participate in the lifting movement of the planting tube 1. As the piston rod 14a of the hydraulic cylinder 14 completes its power stoke, the movable plate 3 actuates a limiting switch (not shown) so as to exhaust the hydraulic cylinders 9 and 14, and the arm 4, the planting tube 1 and the earth compacting tube 2 are returned to their upper limiting positions, the movable plate 3 being moved to close the exit opening 3a of the planting tube 1 by means of the piston arm 14a and the coupling means 18.

When the earth compacting tube 2 rises above the ground, the compacting tube 2 and the planting tube 1 are moved back to their downwardly and forwardly inclined positions by the spring 11, as shown in FIG. 1. Immediately thereafter, another plant is drawn from the supply, and conveyed through the tube 1, to rest on the movable plate 3.

Should the movable plate 3 strike a stone or some other impenetrable object as the planting tube 1 digs into the ground, the plate 3 is moved upwards, a suitable maximum play in relation to the pointed portion of the planting tube being approximately 2.5 cm. The upwardly directed force acting on the movable plate 3 in these circumstances is absorbed by the shock absorber 17, co-acting with the hydraulic cylinder 14. The play which corresponds to the whole of the upwardly directed force, is normally approximately 1.5 cm. The shock absorber is arranged to rapidly return the plate 3 to its lower limiting position. In the event of a stone being struck, the planting operation is interrupted, either manually or automatically, by means of devices not shown.

The invention is not limited to the described and illustrated embodiment, but can be modified within the scope of the claims. For example, it is not necessary for the planting tube 1 and the devices coacting therewith to be pivotably mounted on an arm 4, as described above, in order to be held stationary during a digging and planting operation. The arm can be replaced with a telescopic jib, which can be extended and withdrawn in the longitudinal direction of the apparatus.

FIG. 5 illustrates one such embodiment. In the Figure, like parts are identified by like reference numerals. The telescopic jib 26 is extended and withdrawn by a hydraulic cylinder 27. The frame 16 and the planting tube 1 are, with this embodiment, securely attached to one end of the jib.

Figure 7:
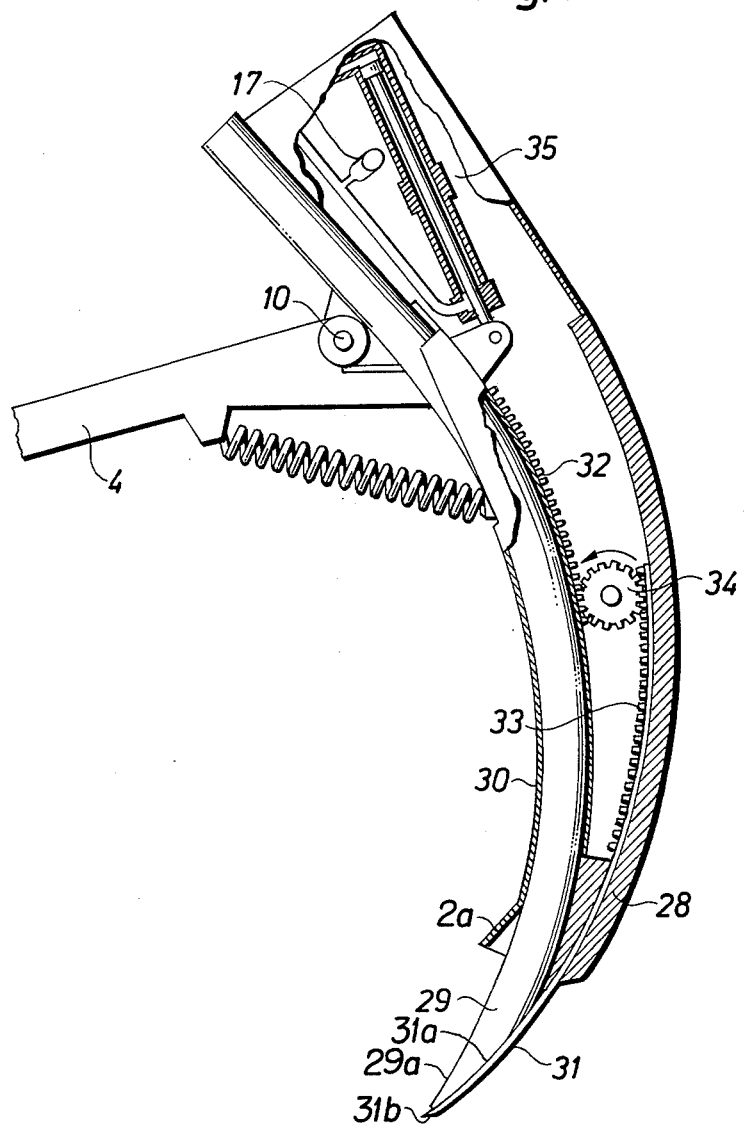
FIG. 7 is a diamgrammatic side view of another embodiment of the planting machine according to the invention.
Figure 8:
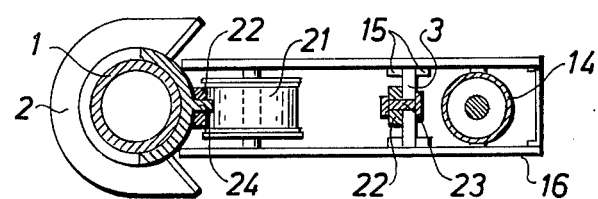
FIG. 8 is a cross-section of the planting apparatus of FIG. 1, taken along the line I—I in FIG. 2.

In place of a chain and sprocket wheels for simultaneously driving the earth compacting tube 2 and the movable plate 3, the earth compacting tube 2 and the movable plate 3 can be provided with a rack and pinion drive mechanism (see FIG. 7). The chain and sprockets can also be replaced with an endless belt and guide wheels, or any other suitable device for simultaneously driving the earth compacting tube 2 and the movable plate 3.

The planting tube 1 and compacting tube 2 described in FIGS. 1 to 6 and 8 have a conventional straight configuration, but the planting tube 1 and the compacting tube 2 also can be of arcuate configuration. Such an embodiment is shown in FIG. 7, and affords a certain amount of freedom in the design of the apparatus and of the carrying vehicle. For example, the distance from the plant supply to the upper portion of the planting tube 1 can be shortened, which allows the height of the vehicle to be adapted to height requirements for integrated construction.

FIG. 7 shows an earth compacting tube 2 and movable plate 3 provided with a rack and pinion drive for driving the compacting tube 2 and movable plate 3. The machine shown in FIG. 7 has an arcuate frame 28 which is pivotably arranged around the pivot pin 10 at one end of the arm 4. Securely attached to the frame is an arcuate planting tube 29, along which is displaceably arranged an earth-compacting tube 30, having the same radius of arc as the planting tube 29. A movable plate 31 is arranged for closing and opening the exit opening 31a of the planting tube 29. In its closing position, the end 31b of movable plate 31 extends some what beneath the tip portion 29a of the tube 29. As with the embodiment of FIGS. 1 to 6 and 8, the earth compacting tube 30 and the movable plate 31 are arranged to be moved simultaneously in opposite directions. To this end, the earth compacting tube 30 and the movable plate 31 are provided with fixed racks 32, 33, which mesh with an intermediate pinion gear 34, journalled on the frame. Displacement of the movable plate 31 and the earth compacting tube 30 is effected by means of a hydraulic cylinder 35, which is pivotably connected to a shock absorber 17 located between the earth compacting tube 30 and the frame 28. The rack and pinion gear drive can be made to move the earth-compacting tube 30 and the movable plate 31 relative to each other at different speeds, by the arrangement of further intermediate gear wheels.

In a further modification of the machine, the hydraulic cylinder for driving the earth compacting tube and the movable plate can be replaced with a rotary motor, for example, a hydraulic motor, an electric motor or a compressed air motor, connected either directly or indirectly to the pinion gear. The earth compacting tube and the movable plate can also be connected to separate drive means which may or may not be provided with synchronized couplings. The tension spring arranged between the arm 4 and the frame, for returning the planting tube to an elevated position can also be replaced, with, for example, a hydraulic-force accumulator, adapted for single or double-acting control.

Having regard to the foregoing disclosure, the following is claimed as the inventive and patentable embodiments thereof:

1. A digging and planting machine comprising a digging and planting tool including a tubular member movable between a lower position partially embedded in the ground and an upper position above the ground, said tubular member having a lower open digging and planting tip end; closure means mounted solely on the outside of said tubular member and solely for slidable reciprocable movement along the exterior to the digging and planting tool and across said open tip end between a first position completely closing off the open end and preventing entry of dirt thereinto, for digging a hole, and a second position exposing the entire open end for delivery of a plant through the open end of said tubular member into the hole; and means slidable reciprocably between a ground-contacting position and an elevated position for compacting earth around the plant after planting.

2. A digging and planting machine according to claim 1, comprising piston means for reciprocably sliding the closure means between open and closed positions.

3. A digging and planting machine according to claim 1, in which the clsoure means is a plate.

4. A digging and planting machine according to claim 3, in which the closure plate in the closed position extends beyond the tip end to protect the tip end.

5. A digging and planting machine according to claim 4, comprising shock absorbing means resiliently retaining the plate in its closed position.

6. A digging and planting machine according to claim 5, in which the shock absorbing means comprises piston means for moving the plate, and a shock absorber connected to the piston means.

7. A digging and planting machine according to claim 1, having the earth compacting means slidable reciprocably between elevated nonoperative and lowered operative positions; and coupling means connecting the earth compacting means and the clsoure means in a manner such that the closure means and the earth compacting means are slidably reciprocated in opposite directions.

8. A digging and planting machine according to claim 7, in which the coupling means comprises an endless drive means.

9. A digging and planting machine according to claim 7, in which the coupling means comprises a rack and pinion gear system.

10. A digging and planting machine according to claim 1, in which the tubular member is a tube whose digging end is cut off at an angle of less than 45° to the axis of the tube, with a sharp tip having an opening of oval configuration with a long axis and a short axis, and downwardly curved, as seen in the direction of travel of the tube while digging with the long axis of the oval-shaped opening being vertically directed and being from about 2.5 to about 6 times longer than the short axis.

11. A digging and planting machine according to claim 1, in which the tubular member is arranged to be inserted into the ground along a path directed obliquely downwards and forwards in the direction of movement of the vehicle carrying the tubular member.

12. A digging and planting machine according to claim 11, in which the tubular member is a tube having a central passage through which plants can be fed to a hole dug by the tool, and whose digging end is cut off to form a sharp tip having an opening of oval configuration that faces rearwardly.

13. A digging and planting machine according to claim 1, in which the tubular member has straight sides and the closure means is a flat plate.

14. A digging and planting machine according to claim 1, in which the tubular member is of an arcuate configuration and the closure means is a curved plate.

* * * * *

UNITED STATES PATENT OFFICE
CERTIFICATE OF CORRECTION

Patent No. 4,060,043              Dated November 29, 1977

Inventor(s) Stig-Gunnar Lofgren

It is certified that error appears in the above-identified patent and that said Letters Patent are hereby corrected as shown below:

| | | |
|---|---|---|
| Column 1, line 65 | : | "vehciles" should be --vehicles-- |
| Column 2, line 12 | : | "th" should be --the-- |
| Column 2, line 32 | : | "th" should be --the-- |
| Column 3, line 9 | : | "tp" should be --to-- |
| Column 3, line 30 | : | "diamgrammatic" should be --diagrammatic-- |
| Column 3, line 41 | : | "vehcile" should be --vehicle-- |
| Column 4, line 51 | : | "FIg" should be --FIG-- |
| Column 4, line 60 | : | "th" should be --the-- |
| Column 5, lines 16-17 | : | "whereupn" should be --whereupon-- |

UNITED STATES PATENT OFFICE
CERTIFICATE OF CORRECTION

Patent No. 4,060,043　　　　　　　　　Dated November 29, 1977

Inventor(s) Stig-Gunnar Lofgren

It is certified that error appears in the above-identified patent and that said Letters Patent are hereby corrected as shown below:

Column 7, line 22　　:　　"clsoure" should be --closure--

Column 7, line 37　　:　　"clsoure" should be --closure--

Signed and Sealed this

Eleventh Day of July 1978

[SEAL]

Attest:

RUTH C. MASON
Attesting Officer

DONALD W. BANNER
Commissioner of Patents and Trademarks